(12) United States Patent
Jennings et al.

(10) Patent No.: US 7,559,402 B2
(45) Date of Patent: Jul. 14, 2009

(54) VEHICLE CHASSIS

(75) Inventors: Vincent Jennings, Redditch (GB); John Paul Trowton, Leamington Spa (GB)

(73) Assignee: Land Rover, Warwick (GB)

( * ) Notice: Subject to any disclaimer, the term of this patent is extended or adjusted under 35 U.S.C. 154(b) by 203 days.

(21) Appl. No.: 10/519,168

(22) PCT Filed: Jun. 16, 2003

(86) PCT No.: PCT/GB03/02603

§ 371 (c)(1),
(2), (4) Date: Dec. 20, 2004

(87) PCT Pub. No.: WO2004/002808

PCT Pub. Date: Jan. 8, 2004

(65) Prior Publication Data

US 2006/0066090 A1 Mar. 30, 2006

(30) Foreign Application Priority Data

Jun. 26, 2002 (GB) .................................. 0214773.4

(51) Int. Cl.
*B62D 21/02* (2006.01)
(52) U.S. Cl. ...................... 180/312; 180/232; 280/781; 280/788; 280/124.109
(58) Field of Classification Search ................. 280/104, 280/781, 786, 788, 796, 798, 800, 785, 782, 280/797, 124.109; 296/187.09, 193.09; 180/312, 180/232, 299
See application file for complete search history.

(56) References Cited

U.S. PATENT DOCUMENTS

| 1,475,331 | A | | 11/1923 | Wales | |
|---|---|---|---|---|---|
| 1,619,609 | A | * | 3/1927 | Fejes | 280/798 |
| 2,856,226 | A | * | 10/1958 | Purdy | 296/204 |
| 3,774,712 | A | * | 11/1973 | Froumajou | 180/232 |
| 5,374,081 | A | | 12/1994 | Schoderer et al. | |
| 5,458,393 | A | * | 10/1995 | Benedyk | 296/203.01 |
| 5,466,005 | A | | 11/1995 | Kohlmeier et al. | |
| 5,476,303 | A | | 12/1995 | Sakamoto et al. | |
| 6,099,039 | A | * | 8/2000 | Hine | 280/781 |
| 6,193,273 | B1 | * | 2/2001 | Novak et al. | 280/781 |
| 6,428,046 | B1 | * | 8/2002 | Kocer et al. | 280/781 |
| 6,722,696 | B2 | * | 4/2004 | Sonomura et al. | 280/784 |
| 6,808,229 | B2 | * | 10/2004 | Yamaguchi | 296/204 |
| 6,938,948 | B1 | * | 9/2005 | Cornell et al. | 296/187.09 |
| 2002/0029921 | A1 | * | 3/2002 | Dau et al. | 180/312 |
| 2003/0178834 | A1 | * | 9/2003 | Grimm et al. | 280/781 |

FOREIGN PATENT DOCUMENTS

DE 340168 9/1921

OTHER PUBLICATIONS

Workshop Manual Defender 300Tdi, Publication Part No. LRL 0097 ENG (4th Edition) © 2002 Land Rover.
Translation of DE 340168 (listed above).
Written Opinion for PCT/GB03/02603.
Search Report for PCT/GB03/02603.
Preliminary Examination Report for PCT/GB03/02603.

* cited by examiner

*Primary Examiner*—Ruth Ilan
(74) *Attorney, Agent, or Firm*—Brooks Kushman P.C.

(57) ABSTRACT

A vehicle chassis comprises two longitudinal side rails (10, 12). A first cross member (14) extends in a transverse direction between the front ends of the side rails (10, 12) and a second cross member (20) extends in a transverse direction between the central portions of the side rails. The chassis further comprises two secondary longitudinal members (22, 24) extending between the first cross member (14) and the second cross member (20), and the secondary longitudinal members are each connected to the side rails by means of a central support section (28, 30) which is longitudinally spaced between the first and second cross members (14, 20). The structure provides rigid support for the vehicle suspension and for a eye recovery (42), and crumples in a controlled way on frontal impact.

23 Claims, 4 Drawing Sheets

VEHICLE CHASSIS

The present invention relates to vehicles of a chassis construction and to vehicle chassis.

Many modern vehicles, especially saloon, hatchback and estate cars, are of a monocoque construction in which the vehicle body includes relatively rigid portions which give it strength and rigidity. However some vehicles, in particular commercial vehicles and those designed for off road driving, are of a chassis construction, comprising a chassis frame which is a separate structure and has the body attached to it.

It is known from GB 259,466 to provide a substantially flat vehicle chassis including an auxiliary frame on which a vehicle engine can be mounted.

The present invention provides a vehicle chassis comprising two longitudinal side rails each having a central portion and a front portion, a first cross member extending in a transverse direction between the side rails and a second cross member extending in a transverse direction between the central portions of the side rails, wherein the chassis further comprises two secondary longitudinal members extending between the first cross member and the second cross member, and the secondary longitudinal members are each connected to the side rails by means of a central support section which is longitudinally spaced between the first and second cross members, wherein the front portions are arranged in use to be higher than the central portions and the first cross member extends between the front ends of the side rails and is arranged to be, in use, below the front ends of the side rails over a substantial part of its length.

Preferably the first cross member is arranged to be, in use, below the front ends of the side rails over a substantial part of its length. This can help to spread impact loads if the vehicle is involved in an impact.

The first cross member may be connected to the side rails by means of vertically extending front support sections. Alternatively it can be curved upwards at its ends to meet the side rails.

Preferably the secondary longitudinal members are connected to the first cross member at respective connection points which are lower than the front ends of the side rails. This also helps to spread impact loads.

Preferably each of the secondary longitudinal members has a front portion which is inclined upwards towards the front. Each secondary longitudinal member may further include a rear portion which is substantially horizontal. This arrangement encourages the secondary longitudinal members to deform downwards on frontal impact, which can counteract any tendency of the side rails to bend upwards.

Preferably each secondary longitudinal member has a weakened bend at the junction between the front and rear portions to encourage downward bending of the secondary longitudinal member in the event of a frontal impact.

Preferably the chassis further comprises a third cross member extending in a transverse direction between the secondary longitudinal members at a position longitudinally spaced between the first and second cross members. This helps to support the secondary longitudinal members in the lateral direction.

Preferably the third cross member is approximately level, in the longitudinal direction, with the central support sections, thereby providing lateral support for them.

Preferably the central support sections each provide support for a suspension mount.

The suspension mount may be positioned on the central support section adjacent to one of the secondary longitudinal members so that the secondary longitudinal member provides longitudinal support for the suspension mount. Alternatively it can be mounted on the secondary longitudinal member adjacent to the central support section.

Preferably the suspension mount is substantially level, in the vertical direction, with the secondary longitudinal members.

Preferably the chassis further comprises a recovery attachment, such as a recovery eye, attached to substantially the mid point of the first cross member.

Desirably the secondary longitudinal members are connected to the first cross member at respective points inboard of the side rails.

Preferred embodiments of the present invention will now be described by way of example only with reference to the accompanying drawings in which.

Figure 1:
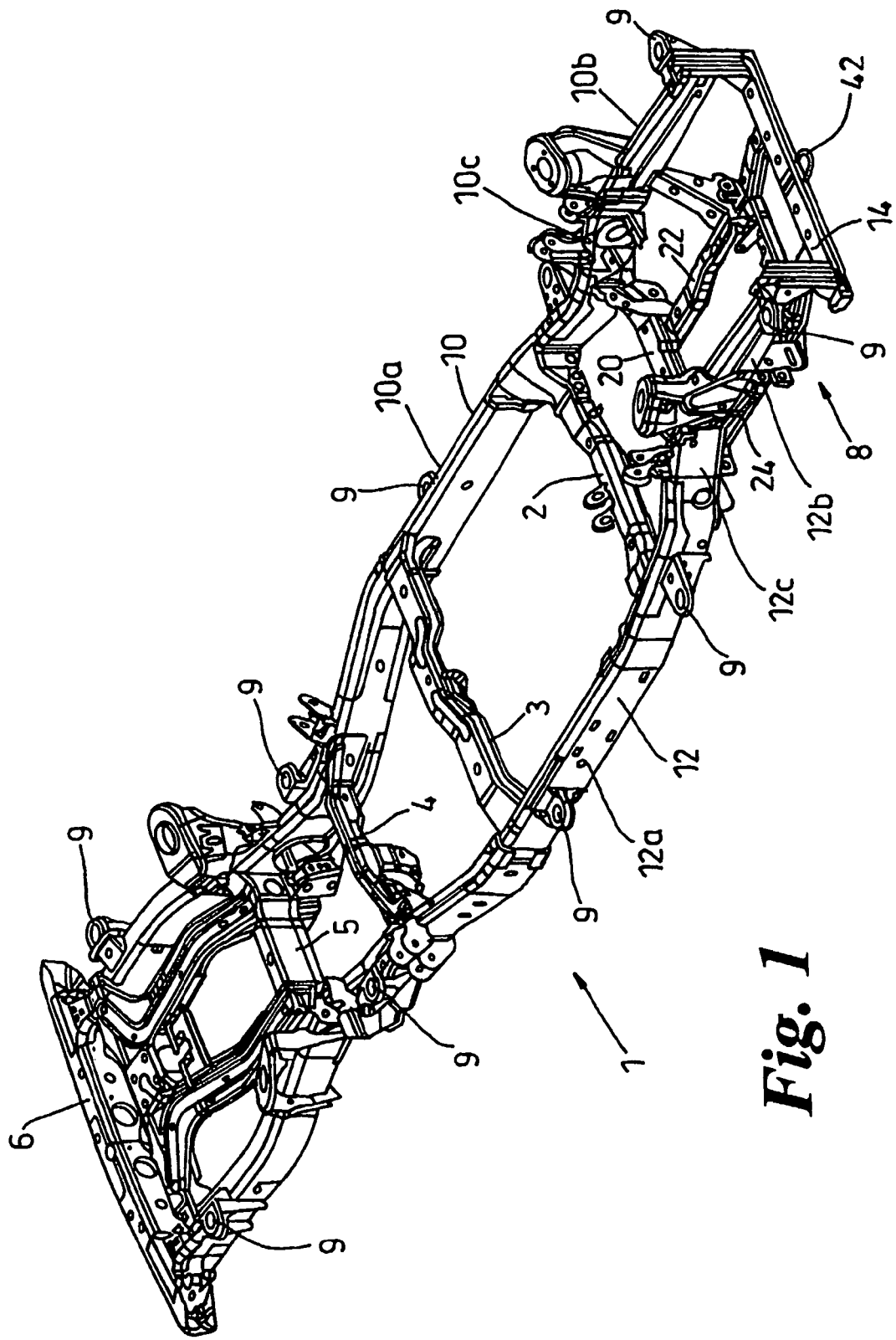
FIG. 1 is a perspective view of a chassis according to the invention.

Referring to FIG. 1, a chassis 1 comprises a pair of side rails 10, 12, each of which has a lower central portion 10a, 12a, which is substantially horizontal and extends in a region of the vehicle generally adjacent the vehicle's doors, and a front portion 10b, 12b which is generally horizontal and extends to the front end of the vehicle in the region of the engine compartment, and an intermediate portion or swan neck 10c, 12c which joins the front end of the central portion 10a, 12a, to the rear and of the front portion 10b, 12b and slopes upwards towards the front. Each longitudinal therefore has two curves 11a, 11b, (see FIG. 2) one at each end of the swan neck 10c, 12c. The longitudinals 10, 12 also extend to the rear end of the chassis 1. A number of cross members 2, 3, 4, 5, 6 extend between the central 10a, 12a, and rear 10d, 12d, portions the side rails 10, 12. A number of body mounts 9 are provided on the chassis, by means of which the vehicle body is mounted on the chassis.

Figure 2:
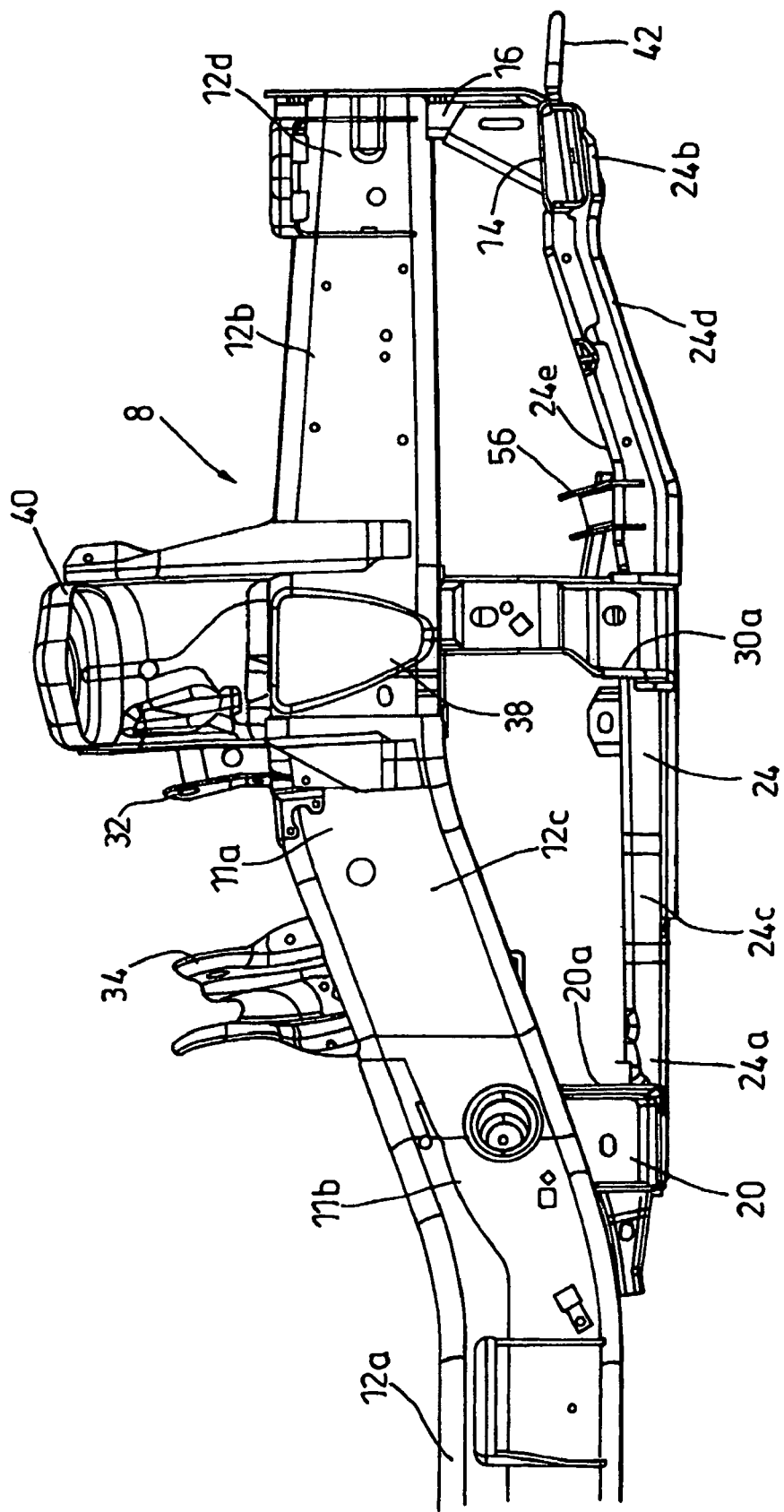
FIG. 2 is a partial side view of the chassis of FIG. 1.
Figure 3:
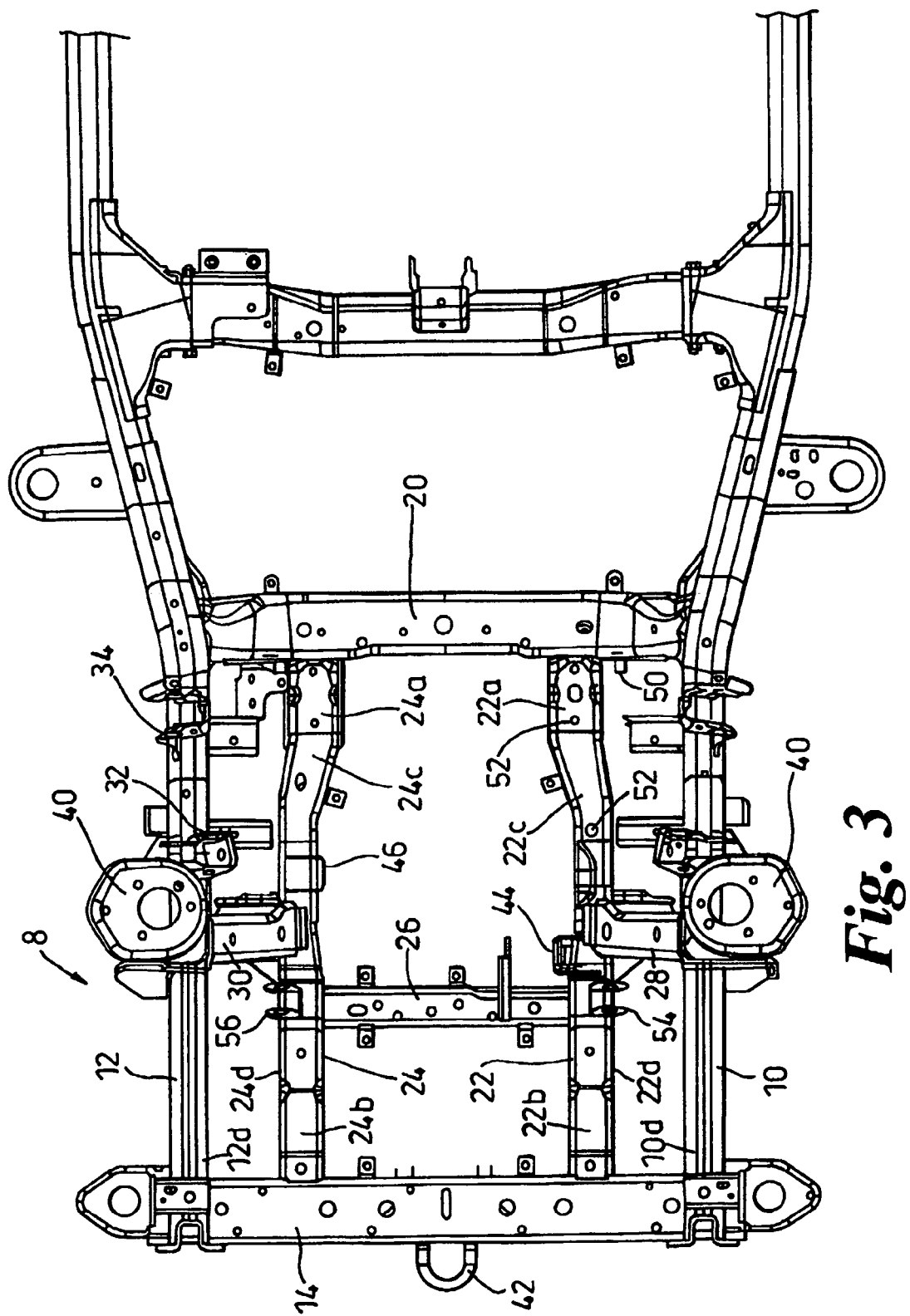
FIG. 3 is a partial plan view of the chassis of FIG. 1.
Figure 4:
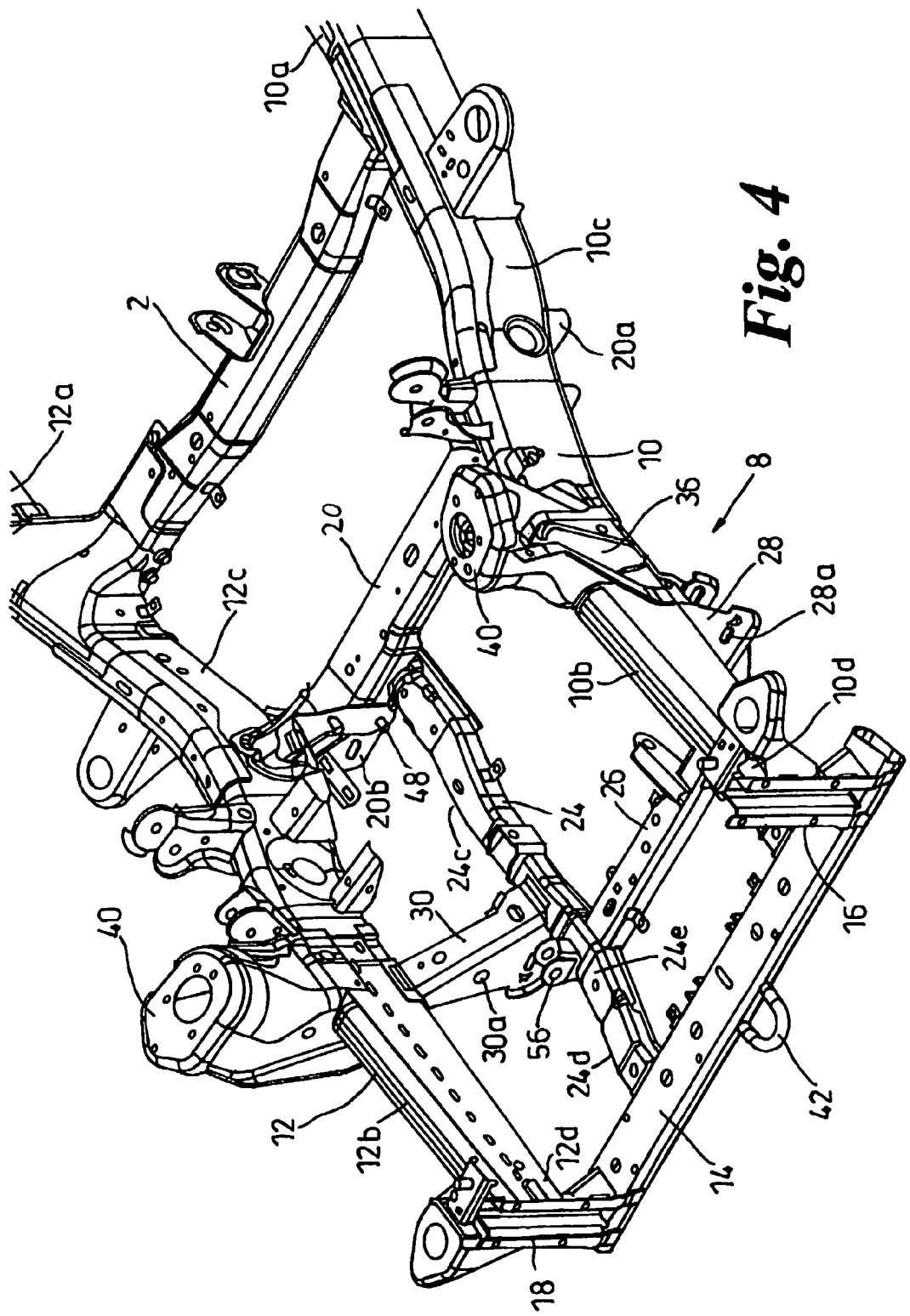
FIG. 4 is a partial perspective view the chassis of FIG. 1.

The front portion 8 of the chassis 1, with which the present invention is primarily concerned, will now be described in more detail with reference to FIGS. 2 to 4. A front cross member 14 extends horizontally across the front of the chassis, being joined at each end to the front end of one of the side rails 10, 12, by means of a vertically extending front support section 16, 18. The front cross member 14 is therefore supported below the front ends of the side rails 10, 12.

A rear cross member 20 extends horizontally across the chassis between the side rails having each end connected to a respective one of the side rails 10, 12 in the region of the curve 11b at the lower end of the swan neck 10c, 12c. The lower cross member 20 is therefore substantially level in the vertical direction with the central portions 10a, 12a of the side rails 10, 12.

A pair of secondary longitudinal members 22, 24 extend substantially horizontally between the front and rear cross members 14, 20, one on either side of the chassis. The secondary longitudinal members are inboard of, and below the side rails 10, 12, having their rear ends 22a, 24a connected to the rear cross member 20 inboard of the side rails 10, 12 and their front ends 22b, 24b connected to the front cross member 14 inboard of the side rails 10, 12. Each of the secondary longitudinal members 22, 24 has a rear portion 22c, 24c which is substantially horizontal and extends from its rear end 22a, 24a forwards to a point approximately mid-way along the front portions 10b, 12b of the side rails, and a front portion 22d, 24d which is inclined slightly upwards to meet the front cross member 14.

A third, central cross member 26 extends horizontally between the two secondary longitudinal members, being connected to them at the front of their horizontal rear portions 22c, 24c.

Central support sections 28, 30 connect the centre of each of the secondary longitudinal members 22, 24 to the side rails 10, 12 towards the rear of their horizontal front portions 10b, 12b. The central support sections are therefore approximately level with in the longitudinal direction, but just to the rear of, the central cross member 26.

The side rails 10, 12, secondary longitudinal members 22, 24, the three cross members 14, 20, 26 and the front and central support sections 16, 18, 28, 30 are all rigidly connected together, in this case by welding and bolting, to form a single unitary rigid structure.

The lower end of each of the central support sections 28, 30 provides a suspension mounting point 28a, 30a arranged to provide a front mounting for a lower suspension arm (not shown). The ends of the rear cross member 20, which extend down below the side rails 10, 12, provide further suspension mounting points 20a, 20b arranged to provide rear mountings for the lower suspension arms. Mounting points 32 for an upper suspension arm (not shown) are provided on the front ends of the intermediate portions 10c, 12c of the side rails 10, 12. The side rails 10, 12 have recesses 36, 38 formed in their outboard sides level with the central support sections 28, 30 to accommodate suspension struts and top mountings 40 for the struts, shown schematically in FIG. 1, are connected to the side rails 10, 12 above the recesses 36, 38.

A recovery eye 42 is connected to the centre of the front cross member 14 and extends forwards from it. The recovery eye 42 is angled slightly to the horizontal so as to be inclined downwards towards the front substantially parallel to the front portions 22d, 24d of the secondary longitudinal members 22, 24.

Mounting points 44, 46, for a differential are provided on the left and right secondary longitudinal members 22 24 respectively. The rear portion 22c of the left secondary longitudinal 22 is removable, being secured to the rest of the chassis structure by means of bolts 52 so as to allow removal of the differential.

Mounting points 48, 50 for an anti-roll bar are provided towards the ends of the rear cross member 20. The steering rack is mounted directly to brackets 54, 56 on the outside of the secondary longitudinals adjacent to cross member 26.

The secondary longitudinal members 22, 24 serve to stiffen and strengthen the chassis structure in various ways. In particular, because they provide support in the longitudinal direction to the lower ends of the central support sections 28, 30 they provide longitudinal support for the front lower suspension arm mountings 28a, 30a. Therefore if the vehicle is being driven in uneven terrain and the central support sections 28, 30 or the lower suspension arms are subject to impact, the likelihood of serious deformation of the chassis resulting in suspension mis-alignment is reduced.

A further function of the secondary longitudinal members 22, 24 is that if the vehicle encounters a large low obstruction such as a large boulder or log, the secondary longitudinal members 22, 24, in particular in view of their upwardly inclined front portions 22d, 24d, can ride up over the obstruction, lifting the vehicle, or forcing the obstruction downwards thereby avoiding a heavy impact between the obstruction and the suspension mounting points or even the suspension arms. In such situations the central support sections 28, 30 help to prevent serious upward deformation of the secondary longitudinal members 22, 24.

In the event of a frontal impact, the front cross member 14 and the secondary longitudinal members 22, 24 help to distribute and absorb impact loads through the chassis 8. On a frontal impact the side rails 10, 12 tend to bend upwards at the curve 11b. In a conventional chassis without the secondary longitudinal members 22, 24 this tends to result in the side rails being forced upwards on impact which can reduce their ability to absorb energy by crumpling in the longitudinal direction. However in the chassis 8 of the invention, because of the inclined angle of the front portions 22d, 24d of the secondary longitudinal members, the forces into the secondary longitudinal members tend to act in a slightly downward direction along the direction of those front portions 22d, 24d. The downward angle of the recovery eye 42 means that impact forces on it also act downwards. This tends to force the rear portions 22c, 24c downwards, rotating about their rear ends 22a, 24a. This is further encouraged by a slight narrowing 22e, 24e in the secondary longitudinal members between their front and rear portions 22d, 24d, 22c, 24c. Since the side rails 10, 12 and the secondary longitudinal members 22, 24 are joined together by the central support sections 28, 30, they cannot bend apart vertically, so the overall effect is to counteract the upward tendency of the side rails 10, 12, so that the whole chassis structure 8 crumples rearwardly in a controlled manner.

If the frontal impact is with another vehicle, the structure of the chassis 8 also helps to distribute the impact loads on the other vehicle. In particular, if the chassis 8 forms part of a sports utility vehicle or off-road vehicle, the front end of the side rails 10, 12 will generally be relatively high up compared to a saloon or other type of car. Conventionally this difference in height tends to make the two vehicles incompatible in crash. However the low position of the front cross member 14 combined with the secondary longitudinal members 22, 24 which support it in the longitudinal direction, help to lower and spread the main point of impact to a level more compatible with saloon and other cars.

The structure of the chassis 8 also gives it a high level of rigidity which is useful if the recovery eye 42 is subjected to high loads. This is particularly the case in off road vehicles where the vehicle may need to be winched out of a position in which it has become stuck in a 'snatch recovery'. Because the front cross member 14 is supported by the secondary longitudinal members 22, 24 at points inboard of the side rails 10, 12, the distance between the points of support of the front cross member 14 is significantly less than, and in this case about half, the distance between the side rails. This helps to prevent bending of the front cross member 14 under the effect of high loads on the recovery eye 42. Also the secondary longitudinal members 22, 24 transmit the loads on the recovery eye back into the central portions 10a, 12a of the side rails thereby spreading the load away from the front end of the vehicle. The central position of the recovery eye 42 in the lateral direction also helps the chassis 8 to withstand high loads on it.

The invention claimed is:

1. A vehicle chassis comprising:
   two longitudinal side rails, each of said side rails having a front end, a front portion and a central portion, and each of the front portions being arranged in use to be higher than the respective central portion;
   a first cross member having a length and extending in a transverse direction between the front ends of the side rails and arranged in use to be below said front ends over a substantial part of the length;
   a second cross member extending in a transverse direction between said central portions of the side rails; and two secondary longitudinal members each extending between the first cross member and the second cross member, wherein the secondary longitudinal members are connected to the first and second cross members at respective points inboard of the side rails.

2. The chassis of claim 1 further comprising two vertically extending front support sections configured to connect the first cross member to the side rails.

3. The chassis of claim 1 wherein the secondary longitudinal members are connected to the first cross member at respective connection points which are lower than the front ends of the side rails.

4. The chassis of claim 1 wherein each of the secondary longitudinal members has a front portion which is inclined upwards towards a front of the vehicle chassis.

5. The chassis of claim 4 wherein the front portion is to the front of the central support sections.

6. The chassis of claim 4 wherein each secondary longitudinal member includes a rear portion which is substantially horizontal.

7. The chassis of claim 6 wherein the side rails each include an inclined portion between the central portion and the front portion and the rear portion of each of the secondary longitudinal members has a length and is adjacent to one of said inclined portions over at least a substantial part of the rear portion length.

8. The chassis of claim 6 wherein each secondary longitudinal member has a weakened bend at the junction between the front and rear portions to encourage downward bending of the secondary longitudinal member in the event of a frontal impact.

9. The chassis of claim 1 wherein the secondary longitudinal members are positioned below and inboard of the side rails.

10. The chassis of claim 1 further comprising two central support sections, each of which is longitudinally spaced between the first and second cross members and connects one of the side rails to an adjacent one of the secondary longitudinal members.

11. The chassis of claim 10 wherein the side rails, cross members and secondary longitudinal members are bonded together to form a single rigid structure.

12. The chassis of claim 10 wherein the side rails, cross members and secondary longitudinal members are welded together.

13. The chassis of claim 10 wherein the side rails, cross members and secondary longitudinal members are bolted together.

14. A vehicle chassis comprising:
two longitudinal side rails, each of said side rails having a front end, a front portion and a central portion, and each of the front portions being arranged in use to be higher than the respective central portion;
a first cross member having a length and extending in a transverse direction between the front ends of the side rails and arranged in use to be below said front ends over a substantial part of the length;
a second cross member extending in a transverse direction between said central portions of the side rails;
two secondary longitudinal members each extending between the first cross member and the second cross member;
two central support sections, each of which is longitudinally spaced between the first and second cross members and connects one of the side rails to an adjacent one of the secondary longitudinal members; and
a third cross member extending in a transverse direction between the secondary longitudinal members at a position between the first and second cross members.

15. The chassis of claim 14 wherein the third cross member is approximately level with the central support sections.

16. The chassis of claim 14 further comprising two top mountings for suspension struts, each said top mounting being connected to a respective one of the side rails above a respective one of the central support sections.

17. A vehicle chassis comprising:
two longitudinal side rails, each of said side rails having a front end, a front portion and a central portion, and each of the front portions being arranged in use to be higher than the respective central portion;
a first cross member having a length and extending in a transverse direction between the front ends of the side rails and arranged in use to be below said front ends over a substantial part of the length;
a second cross member extending in a transverse direction between said central portions of the side rails;
two secondary longitudinal members each extending between the first cross member and the second cross member; and
two central support sections, each of which is longitudinally spaced between the first and second cross members and connects one of the side rails to an adjacent one of the secondary longitudinal members, wherein each of the central support sections provides support for a respective suspension mount.

18. The chassis of claim 17 wherein each of the suspension mounts is positioned on the respective central support section adjacent to one of the secondary longitudinal members so that the secondary longitudinal member provides longitudinal support for the suspension mount.

19. The chassis of claim 17 wherein the suspension mount is located at a lower end of the central support section.

20. The chassis of claim 18 wherein the suspension mount is substantially level, in the vertical direction, with the secondary longitudinal members.

21. A vehicle chassis comprising:
two longitudinal side rails, each of said side rails having a front end, a front portion and a central portion, and each of the front portions being arranged in use to be higher than the respective central portion;
a first cross member having a length and extending in a transverse direction between the front ends of the side rails and arranged in use to be below said front ends over a substantial part of the length;
a second cross member extending in a transverse direction between said central portions of the side rails;
two secondary longitudinal members each extending between the first cross member and the second cross member;
two central support sections, each of which is longitudinally spaced between the first and second cross members and connects one of the side rails to an adjacent one of the secondary longitudinal members; and
a recovery eye attached to the first cross member.

22. The chassis of claim 21 wherein the recovery eye is attached to the first cross member substantially at the mid point thereof.

23. The chassis of claim 21 wherein the recovery eye is inclined downwards towards a front of the vehicle.

* * * * *